United States Patent [19]
Reisgies et al.

[11] 3,789,798
[45] Feb. 5, 1974

[54] AUTOMATIC MILKING UNIT

[75] Inventors: Rolf W. Reisgies, Madison; Franklin B. Jones, Delavan, both of Wis.

[73] Assignee: Sta-Rite Industries, Inc., Delavan, Wis.

[22] Filed: Aug. 10, 1972

[21] Appl. No.: 279,337

[52] U.S. Cl. ............................................ 119/14.08
[51] Int. Cl. ............................................... A01j 5/04
[58] Field of Search ................................ 119/14.08

[56] References Cited
UNITED STATES PATENTS

| | | | |
|---|---|---|---|
| 3,246,631 | 4/1966 | Holm | 119/14.08 X |
| 3,556,053 | 1/1971 | Padman et al. | 119/14.08 |
| 3,690,300 | 9/1972 | Tonelli | 119/14.08 |

*Primary Examiner*—Hugh R. Chamblee
*Attorney, Agent, or Firm*—Andrus, Sceales, Starke & Sawall

[57] ABSTRACT

An automatic milking unit to be associated with a milking stall or palor. The milking unit includes a vertical shaft and a housing is mounted for sliding movement on the shaft and carries an arm that supports a milking claw. The housing is biased upwardly to a storage position and when manually lowered, it follows a cam track which rotates the milking claw to a position beneath the cow's udder and is locked in the lowered position. The milking claw is connected by a hose to a milk receptacle adjacent the stall and an automatic release mechanism is incorporated with the receptacle so that the vacuum to the claw and teat cups will be automatically shut off when the milk flow ceases. Cessation of the milk flow releases the teat cups and also acts to unlock the housing so that the arm and claw will be urged upwardly to the storage position.

27 Claims, 14 Drawing Figures

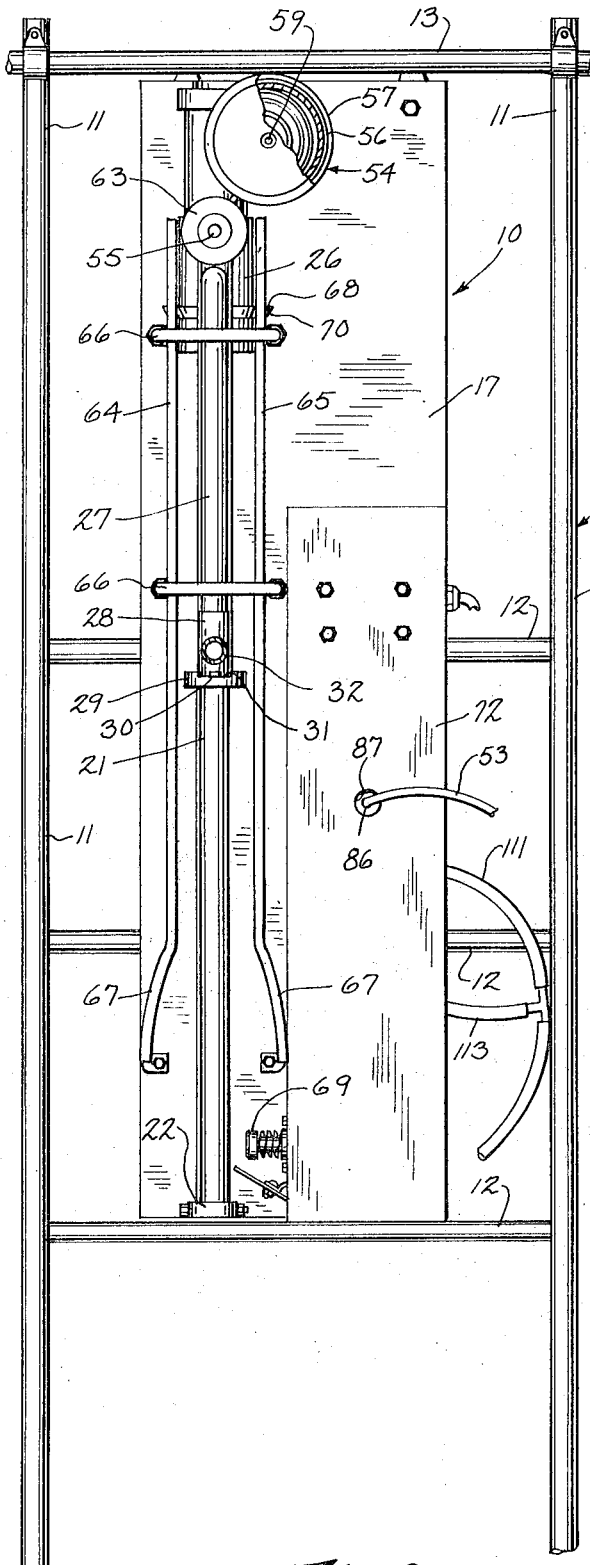
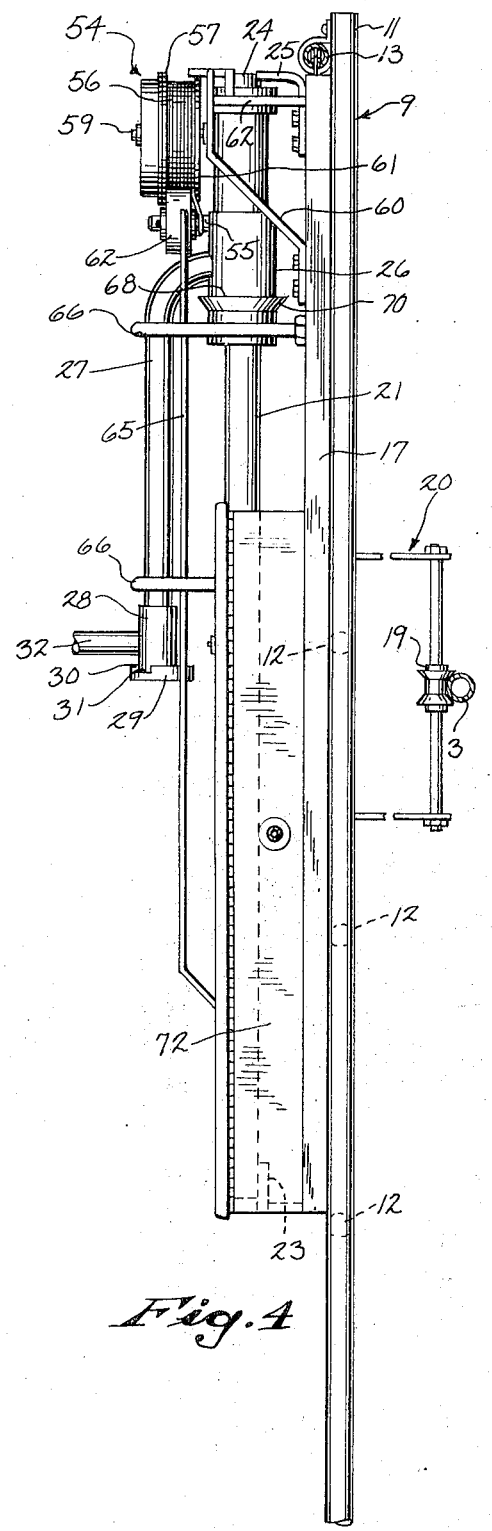
Fig.3
Fig.4

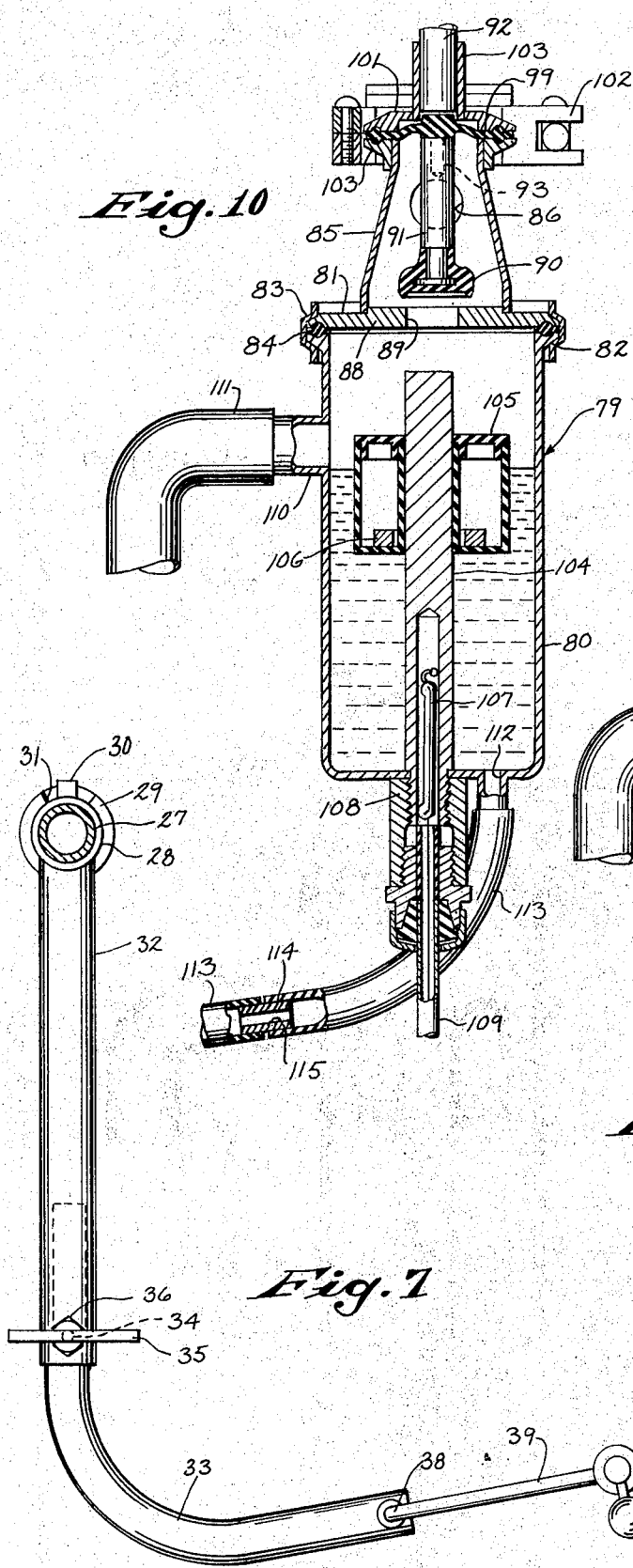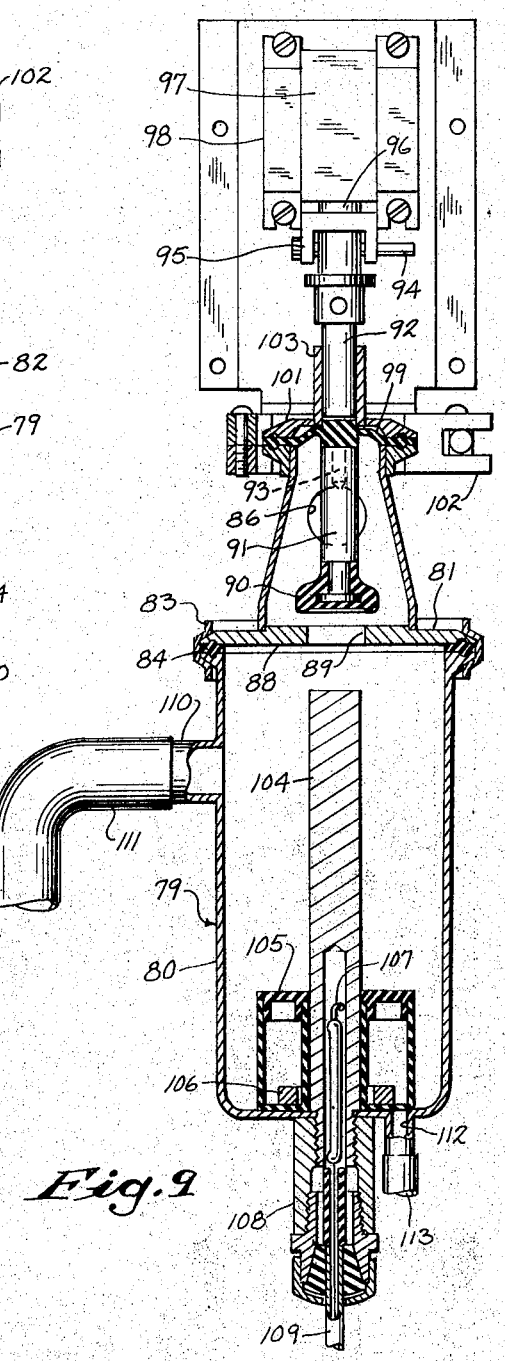

3,789,798

AUTOMATIC MILKING UNIT

BACKGROUND OF THE INVENTION

Because of the problems encountered in obtaining hired help, it has been necessary for the dairyman to resort to the ever increasing use of automatic milking equipment. Automation in the dairy farm has involved not only the use of automatic milkers and release mechanisms for automatically releasing the teat cups from the teats on completion of milking, but has also taken the form of automated systems of cow preparation, milking and discharge, thereby enabling a single dairyman to more efficiently and quickly milk a greater number of cows.

SUMMARY OF THE INVENTION

The invention relates to an automatic milking system which incorporatess an improved automatic release mechanism along with a retractable claw supporting structure so that the teat cups of the claw will be automatically released from the cow's teats on completion of milking and the claw will be withdrawn to a storage location. More specifically, the automatic milking sytem included a supporting column which is mounted adjacent the milking stall and a housing is mounted for sliding vertical movement on the column. The housing carries an arm that supports a milking claw, and associated with the column is a guide track which acts to pivot the arm inwardly as the housing is lowered on the column, to thereby move the claw to a position beneath the cow's udder.

The housing is adapted to be biased upwardly with respect to the column to a storage position by a spring mechanism. For milking, the housing and arm are manually lowered, and the housing rides on the guide track to rotate the claw to a position beneath the cow's udder and the arm and claw are locked in the lowered position.

The claw is connected by a hose to a milk receiving cup located adjacent the supporting column and an automatic release mechanism is incorporated with the cup so that the vacuum to the teat cups of the claw will be automatically shut off when the milk flow ceases, and the teat cups will thereby be automatically released from the cow's teats. Cessation of the milk flow also acts to release the locking mechanism for the housing so that the spring mechanism will urge the claw and arm upwardly to the storage position.

With the milking system of the invention, the claw and supporting arm are automatically retracted after the milking operaion has been completed to a position over the operator's head. At this elevated position, the claw will not restrict access of the operator moving through the aisle adjacent the milking stalls and there is no possibility of the claw or supporting arm being accidently kicked by the cow in the stall.

The milking system eliminates a substantial portion of the labor involved in miling and enables one operator to handle more cows in a more efficient manner. After applying the teat cups to the cow's udder and adjusting the location of the claw, the molking operation can proceed to completion without supervision for the operator is not required to remove the teat cups from the cow's udder, nor is he required to move the claw from beneath the cow's udder, for the teat cups are automatically released and the claw is automatically retracted to the upper storage position at the completion of the milking operation.

The milking system includes a mster automatic release mechanism for teats and the release mechanism eliminates overmilking and possible injury to the cow's udder.

As a further advantage, the milking system is particularly adaptable to clean-in-place techniques and the washing solution can be conveyed through the unit following the same path as the milk to completely clean all of the components without disassembly.

Other objects and advantages will appear in the course of the folliwing description.

The drawings illustrate the best mode presently contemplated of carrying out the invention.

In the drawings:

FIG. 3 is a front elevation of the milking unit showing the housing and claw supporting arm in the upper storage operation position;

FIG. 4 is a side elevation of the milking unit of FIG. 3;

FIG. 7 is a plan view of the supporting arm for the milking claw;

FIG. 9 is a vertical section of the automatic release mechanism with the float in the lower position;

FIG. 10 is a view similar to FIG. 9, showing the float in the upper position;

FIG. 1 illustrates a milking system of the invention, as associated with a herringbone type of milking parlor. It is contemplated however that the milking system of the invention can be utilized with any type of milking parlor or milking stall, and the use of the herringbone parlor is merely illustrative of the practice of the invention.

Figure 1:
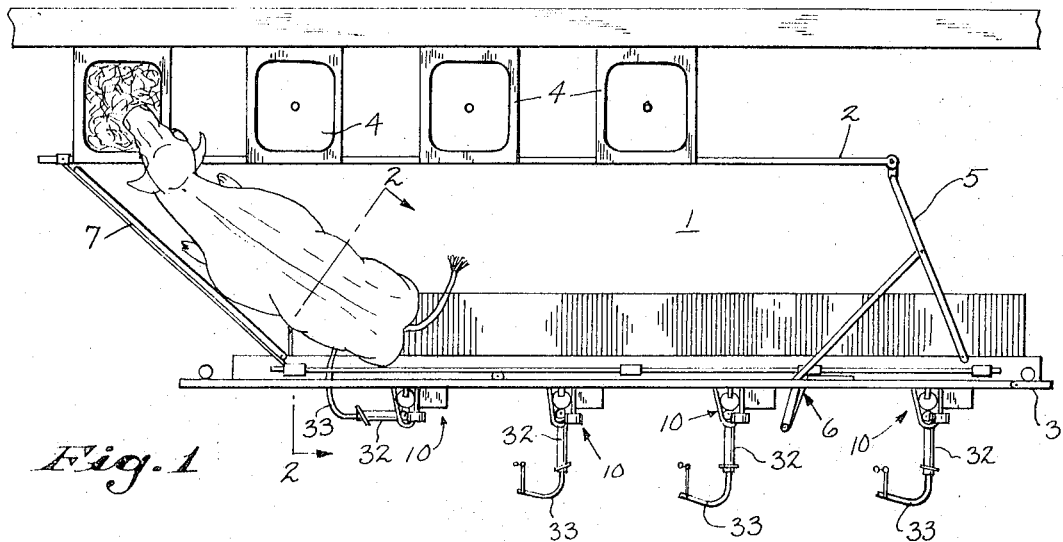
FIG. 1 is a schematic plan view of a herringbone milking parlor incorporating the milking system of the invention.

As shown in FIG. 1 the parlor includes a floor or foundation 1 and parallel guide rail assemblies 2 and 3 are mounted on the foundation. A series of feed trays 4 are mounted on guide rail assembly 2 and provide feed for the cows while they are being milked in the parlor.

The cows are admitted to the milking area between the guide rail assemblies 2 and 3 through an entry gate 5 which is manually opened and closed through an operating mechanism indicated generally by 6. After milking, the cows are discharge from the parlor through an exit gate 7, which extends between the rail assemblies 2 and 3.

Figure 2:
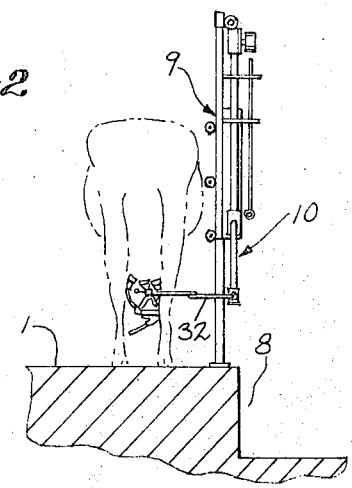
FIG. 2 is a section taken along line 2—2 of FIG. 1.

As best illustrated in FIG. 2, the floor or foundation 1 of the milking parlor is located adjacent a depression or pit 8 and the pit provides an access area for the operator. A series of supporting frames, indicated generally by 9, are mounted above the floor 1 adjacent the pit and each of the frame 9 supports a milking unit 10. As shown in FIG. 1, there are four milking units 10 associated with the parlor, but this number can vary depending on the size of the milking operation.

Figure 5:
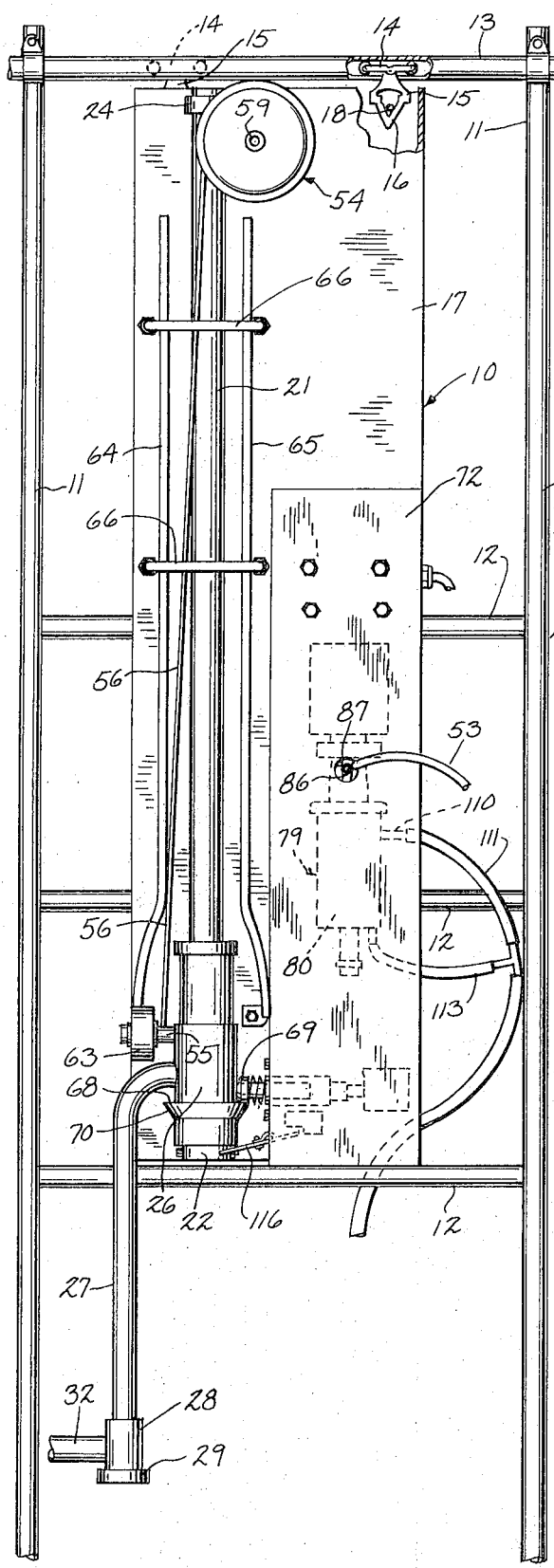
FIG. 5 is a view similar to FIG. 3 and showing the housing and arm in the lower milking position.
Figure 6:
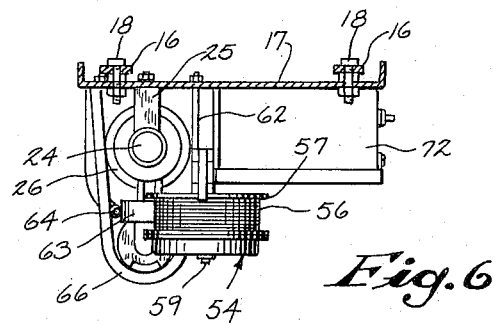
FIG. 6 is a top view of the milking unit shown in FIG. 3.
Figure 8:
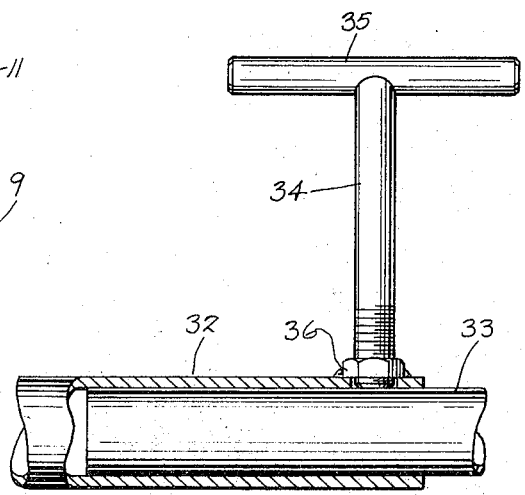
FIG. 8 is an enlarged side elevation with parts broken away showing the attachment of the central arm section to the inner arm section.
Figure 12:
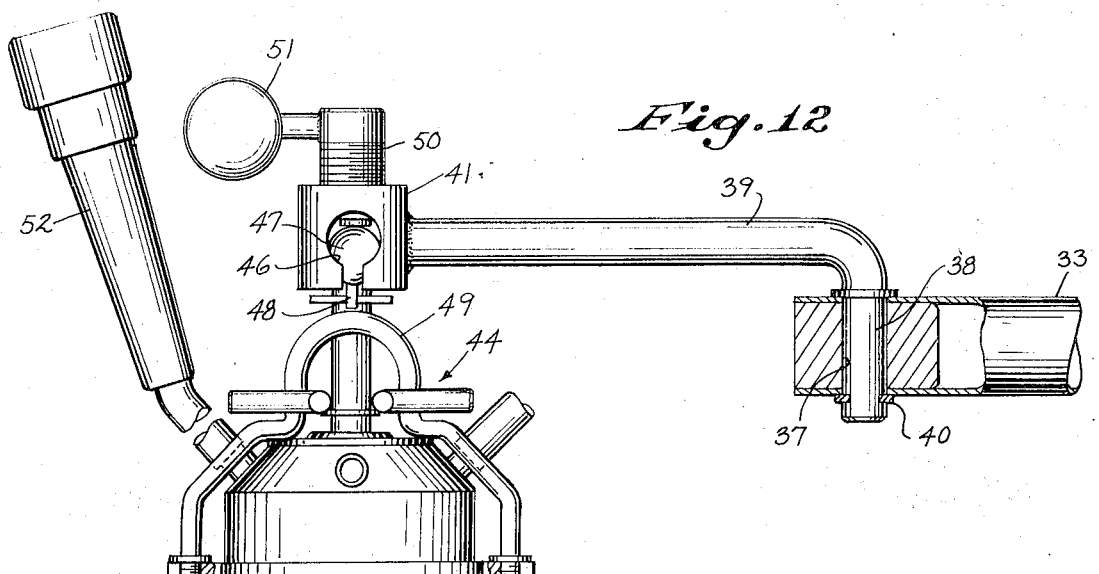
FIG. 12 is an enlarged side elevation with parts broken away showing the attachment of the central arm section to the outer arm section.
Figure 13:
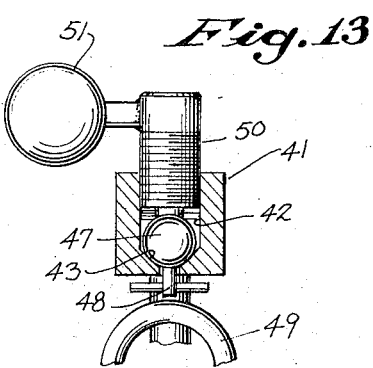
FIG. 13 is a vertical section showing the attachment of the claw assembly to the outer arm section.

As shown in FIG. 5, each of the supporting frames 9 includes a pair of spaced vertical columns 11, and the columns 11 are connected by a series of horizontal supports 12. In addition, the upper ends of columns 11 support a horizontal tubular track 13 and each milking unit 10 is suspended for travel on the track. More specifically, a pair of trolleys 14 are mounted to ride within the tubular track, 13 and a bracket 15 connects the trolley wheels of each trolley and extends downwardly within a slot formed in track 13. The lower end of each bracket is provided with an opening that communicates with a tapered slot defined by the V-shaped extension 16. Each milking unit 10 includes a vertical channel 17 and studs 18 are connected to the upper portion of the channel and are wedged within the respective tapered slots of bracket extensions 16 to thereby suspend the milking unit from the trolleys 15 and permit the milking unit to be moved along the track 14.

To prevent the milking unit 10 from swaying in a direction toward and away from the milk stall, a guide 19 is carried by a bracket assembly 20 connected to the rear surface of channel 17, and the guide 19 bears against one of the rails 3. Engagement of the guide 19 with the rail maintains the milking unit in a generally vertical position and the guide can ride along the rail if the milking unit 10 is moved along the track 14.

Each of the milking units 10 also includes a vertical shaft or column 21 which is spaced forwardly of the channel 17, and the lower end of the shaft is supported on a base 22 that is secured to channel 17 through angle bracket 23. The upper end of the shaft 18 is provided with a cap 24 which is connected to the upper end of the channel 17 through an angle bracket 25.

Mounted for sliding movement on the shaft 21 is a cylindrical housing 26 and a support arm 27 is welded to the housing and extends downwardly from the housing with the lower portion of the support arm being generally parallel to the shaft 18. The lower end of the support arm 27 carries a claw-supporting arm assembly including a sleeve 28 which is mounted for rotation on the lower end of support arm 27 and bears against a fixed collar 29 secured to the lower end of the support arm 27. To limit the degree of rotation of the sleeve 28 with respect to the support arm 27, the lower edge of the sleeve is provided with a projection 30 that is received within an arcuate notch 31 formed in the collar 29. Engagement of the projection 30 with the side edges of the notch 31 limits the degree of rotation of the sleeve 28 with respect to the support arm 27.

The arm assembly which supports the milking claw includes a generally horizontal tubular arm 32 having its inner end welded to the sleeve 28. One end of a generally L-shaped arm 33 is slidably received within the outer end of arm 32 and is locked therein by a locking screw 34 which is provided with an outer handle 35. Screw 34 is threaded within a nut 36 welded on the outer end of arm 32, and by threading the screw inwardly, the inner end of the screw will bear against the L-shaped arm 33 to lock the arm in position with respect to the arm 32.

This construction provides an adjustable connection between arms 32 and 33. For example, the end of the L-shaped arm 33 can be moved axially with respect to the arm 32 and can also be rotated about the axis of arm 32, thereby providing adjustment between the two arms.

The outer end of the L-shaped arm 33 is provided with a hole 37 which receives the bent vertical end 38 of an outer arm 39. The bent end 38 projects through the hole 37 and is locked with respect to the L-shaped arm 33 by a locking ring 40 which is received within a peripheral groove in the projecting end 38.

The outer end of the arm 39 is welded to a cylindrical block 41 having a central threaded passage 42 that terminates in a seat 43. The block 41 is adapted to provide an adjustable support for a bale assembly 44 which carries a milking claw 45. To attach the bale assembly 44 to the block 41, the side of the block, 90° from the attachment of the arm 39, is provided with a keyhole shaped slot 46 which receives the ball 47 and stem 48 of the bale assembly. Stem 48 is connected to a bale 49 which supports the claw 45. The ball 47 and stem 48 are inserted within the slot 46 and the ball 47 is lowered into engagement with the seat 43. The ball is locked with respect to the seat 43 by a locking nut 50 which is threaded within the central opening 42. Handle 51 is secured to the nut 50, and by rotating the handle 51 the lock nut can be threaded down to thereby lock the ball 47 against the seat 43 to fix the position of the bale 49 and claw 45. The use of the ball connection provides a universal adjustment for the position of the claw 45.

The claw 45 is a conventional type and includes four teat cups 52 which are adpated to be secured to the cow's teats. Milk from the teat cups 52 is conducted to the claw 45 and then flows through hose 53 to the automatic release mechanism, as will be hereinafter described.

The arm assembly provides universal adjustment for the claw 45 so that the claw can be located in any desired position or inclination with respect to the cow's udder. For example, the L-shaped arm 33 can be moved axially with respect to the horizontal arm 32, to change the lateral position of the claw 45, as well as being rotated with respect to the arm 32 to vary the inclination of the claw. An adjustment is also provided by the arm 39 which is capable of pivoting about the axis of the hole 37 in the L-shaped arm 33, and a further adjustment can be achieved by the rotational movement of the ball 47 of bale assembly 44 on the seat 43.

The arm assembly which carries the claw 45 is adapted to be moved from an upper storage position, in which the claw is located above the pit 8 and over the operator's head, to a milking position in which the claw is located beneath the cow's udder as illustrated in FIG. 2. The housing 26 and the attached arm assembly which carries the claw 45 is biased to the upper storage position by a spring mechanism indicated generally by 54. A horizontal shaft 55 is secured to the housing 26 and the outer end of the cable 56 is secured to the shaft 55. Cable 56 is wound on a rotatable drum 57 of the spring mechanism 54, and the inner end of the cable is connected to the periphery of the drum. A coiled clock spring 58 is located within the drum 57 and the outer end of the spring is attached to drum 57, while the inner end of the clock spring 58 is connected to the fixed shaft 59. With this construction, the resiliency of the clock spring 58 will tend to rotate drum 57 in a direction to coil the cable 56 on the drum 57 and thereby urge the housing 26 upwardly. By pulling the housing 26 downwardly against the force of the spring 58, the cable 56 will be unwound from the drum 57.

To support the spring mechanism 54, a bracket 60 connects the end plate 61 of the drum 57 to the supporting channel 17. Additional support is provided by a horizontal support 62 which extends between the upper end of the channel 17 and the brackets 60.

The housing 26 is adpated to be moved downwardly by the operator against the force of the spring 58 to position the claw 45 beneath the cow's udder in preparation for milking. To guide the housing in downward movement, a roller 63 is mounted for rotation on the shaft 55 and the roller 63 is adapted to ride on one of a pair of rod-like tracks 64 and 65, which are generally parallel to the shaft 21. Tracks 64 and 65 are supported from the channel 17 by a pair of generally U-shaped supports 66. The ends of the supports 66 are bolted to the channel 17, while the supports are welded to the respective tracks 64 and 65 at locations where they will not interfere with the movement of the roller 63 on the tracks.

As best illustrated in FIG. 3, the lower end 67 of each track 64 and 65 is curved outwardly. Only one of the two tracks 64 and 65 is used for a particular installation, but the two tracks enable the milking unit to be mounted either in a left or right hand manner.

To move the housing 26 and the attached arm assembly and claw 45 to the milking position, the operator, standing in the pit 8, will reach up and grasp the arm assembly and pull downwardly against the force of the spring 58. Roller 63 will then ride downwardly on track 64, and as the roller approaches the lower curved end 67, the operator will move the arm assembly and claw 45 laterally to a position where the claw is beneath the cow's udder and the roller will follow the curved track end 67.

To lock the housing 26 in the lower milking position, the lower portion of the housing is provided with a peripheral ledge 68 which engages a spring loaded plunger 69 to maintain the housing 26 in the lower position. As the housing 26 is lowered, the lower beveled edge 70 on ledge 68 will ride against the plunger 69, forcing the plunger inwardly. After the ledge 68 has passed beneath the plunger, the plunger will return outwardly to a location above ledge 68 to prevent upward movement of the housing 26 and the claw supporting arm assembly.

Figure 11:
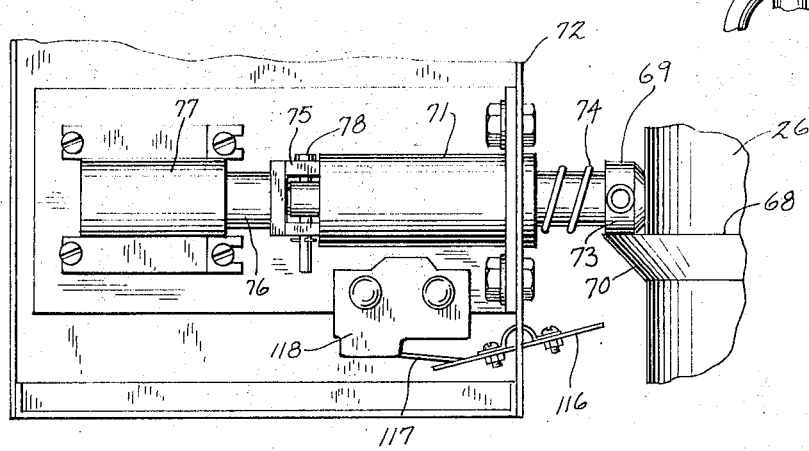
FIG. 11 is an enlarged side elevation showing the locking mechanism for the housing.

As best illustrated in FIG. 11, the plunger 69 is mounted for sliding movement within a sleeve assembly 71 which is mounted within a generally rectangular casing 72 attached to the front surface of channel 17. The outer end of the plunger 69 is provided with an enlarged head 73 and a coil spring 74 is interposed between the head 73 and the outer surface of the casing 72, thereby urging the plunger 69 to the outer or locking position.

The inner end of the plunger 69 is connected to the yoke 75 of the plunger 76 of a solenoid 77 by a pin 78. Energizing of the solenoid 77, as will be hereinafter described, will move the plunger 69 inwardly against the force of spring 74 to thereby release the housing 26 and permit the clock spring 58 to move the housing 26 upwardly to the upper storage position. As the housing 26 is urged upwardly by the spring 58, the roller 63 will ride along the curved end 67 of track 64, thereby pivoting the arm assembly and claw 45 approximately 90° to remove the claw from the position above foundation 1 to a position above the pit 8. As the roller 63 continues to ride upwardly on the straight portion of the track 64, the claw 45 will then move vertically to the storage position above the head of the operator in pit 8.

Each of the milking units 10 incorporates an automatic release mechanism, indicated generally by 79, which will release the teat cups from the cow's teats when the flow of milk has ceased. As best shown in FIGS. 9 and 10, the automatic release mechanism includes a cup or container 80 having an open upper end that is enclosed by a removable head 81. To secure the head 81 to the cup 80, the upper edge of the cup is provided with a flange 82 that is secured to the peripheral edge of the head by a clamping ring 83 and a sealing ring 84 is located within the joint.

The head 81 also includes a central upwardly extending section 85 and an inlet nipple 86 is located in the section 85. The hose 53, which is attached to claw 45, extends through an opening 87 in casing 72 and is attached to nipple 86 so that milk from the claw is conducted to the interior of the head 81.

The lower end or base 88 of head 81 is provided with an opening 89 that defines a valve seat, and opening 89 is adapted to be opened and closed by a valve 90. When valve 90 is in the open position, milk entering the head section 85 through nipple 86 will flow downwardly through the opening 89 into cup 80.

Valve 90 is carried by a stem 91 that is connected to the lower end of a rod 92 by a screw 93. The upper end of rod 92 is attached through pin 94 to a yoke 95 on the end of the plunger 96 of solenoid 97. The solenoid 97 is connected by a mounting plate 98 to the wall of the casing 72. Energizing of the solenoid 97 acts to draw the plunger 96 and valve stem 91 upwardly to open the valve 90.

To aid in returning the valve 90 to the closed position on deenergizing of solenoid 97, a diaphragm 99 is connected between the abutting ends of valve stem 91 and rod 93, and the peripheral edge of the diaphgram is clamped between a flange 100 on head section 85 and a ring 101 by annular clamp 102. Sleeve 103 extends upwardly from ring 101 and serves as a guide for the sliding movement of rod 93.

When the solenoid is deenergized the pressure differential acting on the opposite surfaces of the diaphragm 99 will provide a relatively fast snap action to move the valve 90 to the closed position. More specifically, the upper surface of the diaphragm 99 is exposed to atmospheric pressure while the under surface is subject to vacuum or sub-atmospheric pressure, and the pressure differential will urge the diaphragm downwardly, after deenergizing of solenoid 97, to aid in returning the valve 90 to the closed position. Mounted centrally within the cup 80 is a vertical post or colunn 104 and an annular float 105 is mounted around the post 104 and follows the level of milk in cup 80. As shown in FIGS. 9 and 10, an annular magnet 106 is embedded within the lower portion of the float 105, and magnet 106 is adapted to actuate a conventional reed switch 107 which is located within a central bore formed in the lower portion of post 104 and within an aligned opening in a sleeve 108 which extends downwardly from the bottom surface of cup 80. An electrical lead or conductor 109 extends in sealed relation through the sleeve 108 and is connected to the reed switch 107.

During the milking operation, milk enters the cup 80 through the opening 89 and as the milk level rises in the cup, the float 105 rises and the milk overflows through the outlet nipple 110 in the side wall of the cup. A hose 111 is attached to nipple 110 and extends through an opening in casing 72 and communicates with the vacuum pipeline.

Milk is adapted to drain from the cup 80 through a drain opening 112 formed in the bottom wall of cup 80, and the drain opening 112 is connected by hose 113 to the hose 111. To restrict the flow of milk through the drain opening 112, a plug 114 is located within the hose 113 and has a restricted opening or orifice 115.

Under normal milking conditions, the flow of milk into the cup 80 through opening 89 will exceed the rate at which milk can drain through drain outlet 112, so that the milk level will rise in cup 80 until the milk overflows through the outlet nipple 110. As the cow is milked out and the flow of milk from the claw 45 decreases below the rate of draining through drain opening 112, and the milk level will descend in cup 80 and the float 105 will correspondingly descend.

As previously noted, hose 111 is connected to the vacuum pipeline so that the interior of the cup 80 is normally subjected to vacuum or sub-atmospheric pressure. The valve 90 is normally closed when the claw 45 is in the upper storage position so that no vacuum is drawn in the claw. When the claw is moved downwardly by the operator and swung laterally beneath the cow's udder, the housing 26 will engage the plunger 69 to lock the arm assembly and claw in the lower milking position. In addition, the lower end of the housing will engage and deflect a leaf spring 116 which is connected to an arm 117 of a switch 118, and actuation of the switch 118 will energize solenoid 97 to thereby establish the vacuum from the milk pipeline through the cup 80 and hose 53 to the claw 45. As the milk begins to flow through the hose 53 into the cup 80, the milk level will rise causing the float 105 to rise. A small amount of milk will drain through the drain opening 112, but as the volume of milk entering the cup will normally be substantially greater than that volume draining through drain 112, the level of milk will build up until it overflows through the outlet nipple 110. during the normal milking operation, the float will be in the position shown in FIG. 10.

As the teats are milked out, the flow of milk into the cup 80 will cease causing the level of milk in the cup 80 to recede due to draining through the drain 112. When the magnet 106 in float 105 descends to a position surrounding the reed switch 107, the switch 107 will be actuated to deenergize the solenoid 97 and enable the valve 90 to move to the closed position, thereby cutting off the vacuum to the teat cups. Actuation of the reed switch 107 also energizes the latching solenoid 77 to release the locking plunger 69 so that the housing 26 will move upwardly through the action of clock spring 58. The force of the spring 58 is correlated with the vacuum so that when the latching solenoid 77 is relased, the housing 26 will only move to a position slightly above the latching position due to the fact that the force of the facuum holding the teat cups on the teats is slightly greater than the force of the clock spring 58. However, once atmospheric pressure is restored to the claw by virtue of valve 90 closing and the teat cups are released, the force of the spring 58 will the be sufficient to move the housing upwardly to its storage position. This feature prevents the arm assembly and claw from moving upwardly to the storage position until the teat cups are released from the teats.

Figure 14:
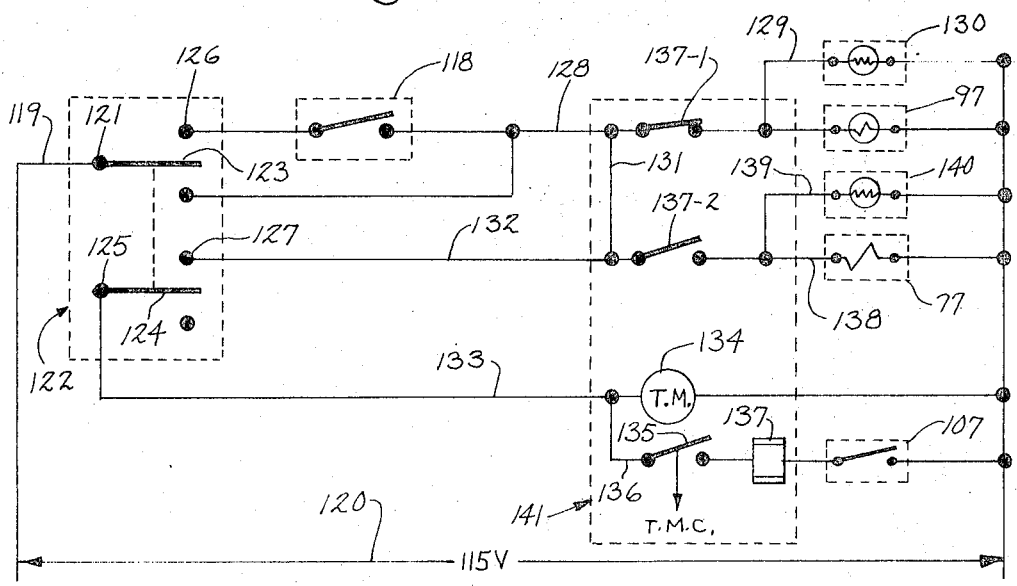
FIG. 14 is a wiring diagram.

FIG. 14 is a wiring diagram for the milking unit. As shown in the wiring diagram, power lines 119 and 120 are connected to a suitable source of power, and line 119 is connected to the terminal 121 of a double-pole, double-throw switch 122. The switch 122 includes a pair of switch arms 123 and 124 with switch arm 123 being connected to terminal 121 and switch arm 124 being connected to terminal 125.

To begin the milking operation, the switch 122 is moved to the "milk" position which connects the switch 123 to the contact 126 and simultaneously connects the switch arm 124 to the contact 127. Moving the switch 122 to the "milk" position supplies power to the normally open switch 118 which is located in the bottom of the casing 72.

When the operator moves the claw 45 downwardly to the milking position, the housing 26 will deflect the leaf spring 116 which is connected to switch 118 to thereby close the switch 118. Closing the switch 118 supplies power through line 128 and the normally closed contacts 137-1 to the milk valve solenoid 97. Power is also supplied through line 129 to light the "vacuum-on" light 30. Energizing the solenoid 97 opens the milk valve 90 to thereby establish vacuum from the milk pipeline to the claw 45. In addition, closing of the switch 118 supplies power through lines 131 and 132, contact 127, switch arm 124, and line 133 to the timer 134 to thereby energize the timer to begin the preset timing period. When the timer 134 times out, swtich 135 in lines 136 is closed. Relay 137 and reed switch 107 are connected in series in the line 136 with the switch 135.

Closing of the switch 135 will initiate two possible sequence of events depending on whether milk has started to flow from the claw 45 to the cup 80. In the event milk does not flow into the cup 80 and the float 105 remains in its lower position, the reed switch 107 will be closed and thus when the timer 134 times out and the switch 135 is closed, the relay 136 will be energized to open the normally closed contacts 137-1 and close the normally open contacts 137-2. Opening the contacts 137-1 will deenergize the solenoid 97 to thereby close the milk valve and shut off the vacuum to the claw. Closing of the contacts 137-2 will energize the solenoid 77 to withdraw the plunger 69 and thereby permit the housing to be moved upwardly to the storage position through the action of the spring 58. Closing of the contacts 137—2 also supply power through line 139 to light the "vacuum-off" light 140.

The upward movement of the housing 26 along with the claw supporting arm assembly causes the switch 118 to open which shuts off power to all of the components and resets the timed delay relay, indicated generally by 141.

In the event that milk flows from the claw 45 into the cup 80, the float 105 containing the magnet 106 rises to open the reed switch 107. Thus, when the timer 134 times out to close the switch 135 no action will occur because the line 136 is open by virtue of the open reed switch 107.

However, when the milk flow ceases and the float 105 descends to a position such that it closes the reed switch 107, the relay 137 will then be deenergized to open the contacts 137-1 and close the contacts 137-2 in the manner previously described. This acts to deenergize the milk valve solenoid 97 and shut off the vacuum to the claw 45 and also acts to energize the latch solenoid 77 to relase the housing 26 and the arm supporting structure. As the housing moves upwardly through action of the spring 58 the switch 118 is opened to shut off the power to the components and reset the timed delay relay 141.

The milking system of the invention eliminates a substantial portion of the labor ordinarily required in a milking operation. The dairyman need only lower the claw, attach the teat cups to the teats and adjust the position of the claw and is not required to remove the teat cups after the milking is completed, nor remove the claw from beneath the cow's udder. The automatic release mechanism is a master type in which the vacuum is shut off when the flow of milk from all four teats is reduced to a predetermined rate. The automatic release mechanism eliminates overmilking and possible udder injuries. While the automatic release mechanism is shown as associated with the retractable arm assembly which carries the claw, it is contemplated that the automatic release mechanism can be used independently.

With the use of the automatic retracting mechanism, the claw is not only moved laterally from the position beneath the cow's udder, but is also elevated to a level where it will not interfere with movement of the dairyman in the aisle adjacent the milk stalls, nor will it interfere with movement of the cow from the milking stall. As a further advantage, the system can be readily cleaned in place without the removal of components by passing the cleaning solution through the system in the same path that the milk takes during the milking operation.

The position and inclination of the claw 45 is universally adjustable due to the adjustable connections of arms 32, 33 and 39, as well as the adjustment of ball 47 of bale assembly 44 on the seat 43. In addition the entire milking unit 10 can be moved along track 13 by virtue of the trolley suspension 15.

Various modes of carrying out the invention are contemplated as being within the scope of the following claims particularly pointing out and distinctly claiming the subject matter which is regarded as the invention.

We claim:

1. An automatic release mechanism for a milking appratus, comprising a milk receiving receptacle milk conduit means connecting a milking apparatus to the receptacle for conducting milk to the receptacle, valve means in said milk conduit means for opening and closing said milk conduit means, second conduit means connecting a source of vacuum to the upper portion of said receptacle, valve opening means for opening said valve means to establish a vacuum through the receptacle and milk conduit means to the milking apparatus, float means disposed within the receptacle and disposed to rise and descend within the receptacle in accordance with the level of milk therein, a magnetic member, a magnetically operable switch member, a first of said members being connected to said float means and the second of said members being disposed adjacent the bottom of the rectptacle, said switch member disposed to be actuated by said magnetic member when the float means is at a lower portion in the receptacle, and valve closing means for closing the valve means on actuation of said switch member as the level of milk descends within said receptacle and said float means descends to said lower position.

2. The mechanism of claim 1, wherein said magnetic member is connected to the float means and switch member is connected to said receptacle.

3. The mechanism of claim 1, wherein said valve opening means includes a solenoid connected to the valve means.

4. The mechanism of claim 3, wherein said switch member is interconnected with said solenoid whereby actuation of said switch member will deenergize the solenoid to permit closing of said valve means.

5. The mechanism of claim 2, and including a vertical post mounted centrally within the receptacle, said float means being annular and surrounding said post.

6. The mechanism of claim 5, wherein said switch member is located in the lower portion of said post, and said magnetic member is annular in shape and surrounds the post.

7. The mechanism of claim 1, wherein said valve closing means comprises a pressure responsive member connected to said valve means, said pressure responsive member being responsive to a differential in pressure between the atmosphere and the source vacuum and acting to urge the valve means to the closed position.

8. The mechanism of claim 7, wherein the pressure responsive member is a diaphragm operably connected to said valve means, one surface of said diaphragm being exposed to the atmosphere and the opposite surface of the diaphragm being exposed to said vacuum source.

9. the mechanism of claim 1, wherein said switch member is a reed switch.

10. The mechanism of claim 5, and including a drain outlet in the lower end of the receptacle, said drain outlet being disposed to be closed off by the float means when the float means is in the lower position.

11. An automatic milking system comprising a supporting structure located adjacent a milking stall, a milking apparatus mounted for movement on the supporting structure between an upper storage position and a lower milking position, biasing means for biasing the milking apparatus to the upper storage position, latching means for latching the milking apparatus in the lower position, vacuum supply means for establishing a vacuum to the milking apparatus to thereby withdraw milk from an animal's teats, automatic release means connected to the milking apparatus and responsive to a predetermined minimum flow of milk for closing the vacuum means to the milking apparatus and releasing said milking apparauts from the animal's teats, and means responsive to operation of said automatic release means for unlatching said latching means to permit the milking apparatus to be moved by said biasing means to the upper storage position.

12. The system of claim 11, wherein the foece of said biasing means is less than the force of said vacuum, whereby the biasing means will not act to move the milking apparatus upwardly until the milking apparatus is removed from the animal's teats through loss of pressure differential.

13. The system of claim 11, wherein said supporting structure includes a generally vertical column and a housing mounted for sliding movement on said column, said milking apparatus being connected to said housing.

14. The system of claim 13, wherein said biasing means is engaged with said housing and is located above said housing.

15. The system of claim 13, wherein said latching means is engageable with said housing to lock the milking apparatus in the lower milking position.

16. The system of claim 13, and including means for rotating the housing through a given arc with respect to the axis of the column as the milking apparatus is moved from the lower milking position to the upper storage position.

17. The system of claim 16, wherein said means for rotating the housing comprising a guide track connected to the column and a follower connected to the housing, the upper portion of said guide track being straight and the lower portion of said track being curved whereby travel of said follower on said curved portion will act to rotate said housing through said arc.

18. The system of claim 11, and including means responsive to latching of said milking apparatus in the lower position for actuating said vacuum supply means and establishing a vacuum to said milking apparatus.

19. The apparatus of claim 18, and including timing means, means responsive to latching of said milking apparatus in the lower position for actuating said timing means and timing out a pre-set time period, and means responsive to the timing out of said preset period for rendering said automatic release means operable, whereby said automatic release means will be operable to close the vacuum means to the milking apparatus if the milk flow is below said minimum flow rate.

20. An automatic milking system comprising a supporting structure located adjacent a milking stall, a milking apparatus mounted for movement on the supporting structure between an upper storage position and a lower milking position, biasing means for biasing the milking apparatus to the upper storage position, latching means for latching the milking apparatus in the lower milking position, vacuum supply means, a milk receiving receptacle, milk conduit means connecting the milking apparatus to the receptacle for conducting milk to the receptacle, valve means in said milk conduit means, second conduit means connecting said vacuum supply means to the upper portion of the receptacle, means responsive to operation of said latching means for opening said valve means to establish a vacuum through the receptacle and milk conduit means to the milking apparatus, float means disposed within the receptacle and disposed to rise and descend within the receptacle in accordance with the level of milk therein, a magnetic member, a magnetically operable switch member, a first of said members being connected to said float means and the second of said members being disposed adjacent the bottom of the receptacle, said switch member disposed to be actuated by said magnetic member when the float means is at a lower portion in the receptacle, valve closing means for closing the valve means on acuation of said switch member as the level of milk descends within said receptacle and said float means descends to said lower position, and means responsive to the operation of said valve closing means for unlatching said latching means to permit the miling apparatus to be moved by said biasing means to the upper storage position.

21. The system of claim 13, and including an arm assembly connected to said housing and supporting said milking apparatus, said arm assembly having adjustment means for varying the position of said milking apparatus with respect to the housing.

22. The system of claim 21, wherein said adjustment means includes a ball member connected to the milking apparatus, socket means connected to said arm assembly and disposed to receive said ball member, and locking means for locking said ball member to said socket means.

23. The system of claim 11, and including mounting means for mounting the supporting structure for horizontal movement with respect to the milking stall.

24. The system of claim 23, wherein said mounting means includes a generally horizontal track disposed a substantial distance above said milking stall, guide means disposed to ride on the track, and suspending means for suspending the supporting structure from said guide means, whereby the supporting structure can be moved along the milking stall as the guide means rides on said track.

25. The system of claim 24, and including means engageable with the supporting structure at a location spaced a substantial distance beneath the track for maintaining the supporting structure in a generally vertical attitude.

26. The mechanism of claim 1, and including means responsive to movement of the milking appartus to a milking position for operating said valve opening means to thereby open said valve means and establish a vacuum to the milking apparatus.

27. The mechanism of claim 1, and including a fixed supporting structure disposed adjacent said milking stall, said receptacle being mounted on the supporting structure.

* * * * *